Sept. 17, 1940.                P. W. PYBUS                2,215,229
                          AUTOMOBILE SIGNAL SWITCH
                            Filed Jan. 24, 1938
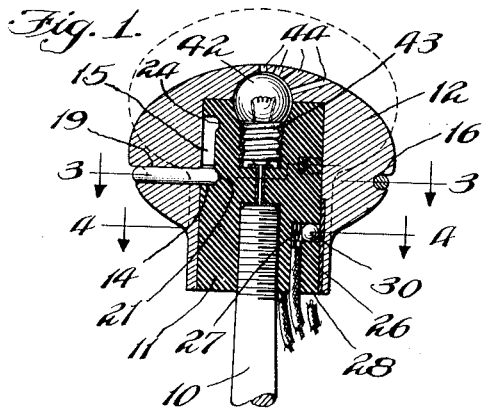
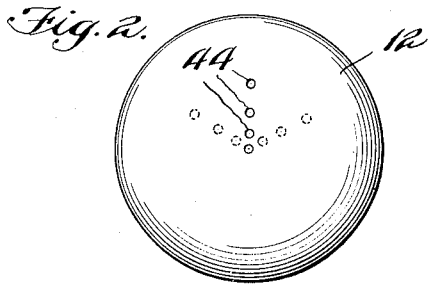
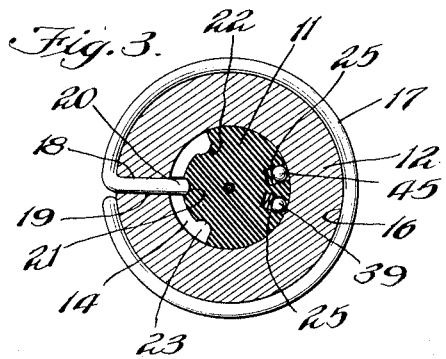
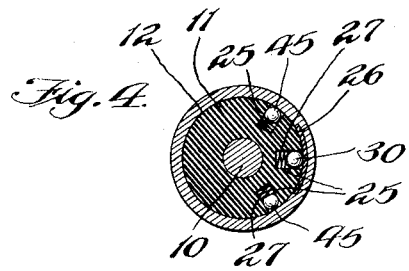
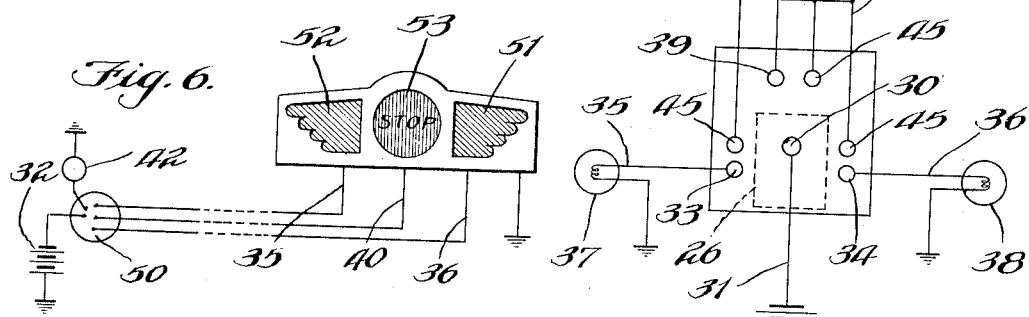
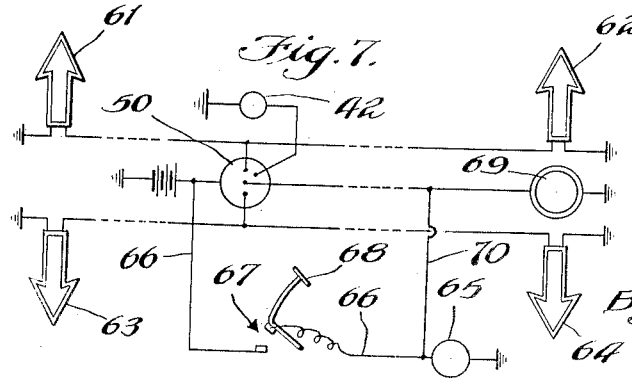
Inventor
Percy W. Pybus
By Kent W. Wonnell
Atty.

Patented Sept. 17, 1940

2,215,229

UNITED STATES PATENT OFFICE 2,215,229

AUTOMOBILE SIGNAL SWITCH

Percy W. Pybus, Chicago, Ill.

Application January 24, 1938, Serial No. 186,606

9 Claims. (Cl. 200—59)

This invention relates in general to a signal switch construction for automobiles located upon the gear shift lever or handle and adapted to give a signal for right and left turning in addition to a separate stop or other signal without requiring the operator to remove his hand from the gear shift knob.

An important object of the invention is in the provision of a shift lever switch including the knob of a shift lever which is movable in either direction and longitudinally of the rod or handle upon which the knob is mounted, to provide for three different signal switch contacts in addition to the position of the switch in a neutral position.

Further objects of the invention are; the provision of improved means for releasably attaching the knob to a gear shift lever and permitting its movement rotarily and endwise of the lever; to position the knob resiliently in any one of the positions in which it is intended to be set; to indicate on the knob itself and by light within and protected by the knob, the direction in which the knob is set; to provide contact means insuring the completion of an electric circuit; to protect the contact making devices from any possibility of engagement with the hand of an operator; to provide a switch of this kind which may be applied equally well to new and old automobiles; to provide a signalling system which may be easily applied to and to form an addition to signalling systems already in use on automobiles; and in general to produce the structure herein shown and described.

In the accompanying drawing illustrating a preferred embodiment of the invention, Fig. 1 is a sectional view of a switch in accordance with this invention attached at the upper end of a gear shift lever;

Fig. 2 is a top view of the knob as shown in Fig. 1;

Fig. 3 is a section taken on the line 3—3 of Fig. 1;

Fig. 4 is a section taken on the line 4—4 of Fig. 1;

Fig. 5 is a diagrammatic view showing the circuits and connections adapted to be made by the switch mechanism as shown;

Fig. 6 is a diagrammatic representation of the simplest installation of the signalling system in connection with the switch; and Fig. 7 is a diagrammatic representation of the signalling system as controlled by this switch in combination with an ordinary brake pedal stop-switch signalling system as now commonly in use on most automobiles.

Many States are now passing laws which make it compulsory for automobile drivers to give a front or rear signal, or both, of an intention to turn to the right or left, and also of the intention to stop before actually effecting any of these operations. It is not sufficient to provide a switch automatically operated by the actual turning, as the signal then comes too late. Furthermore it is inconvenient to operate a switch for giving the desired signals unless it is located within ready reach and access of the operator. It is not convenient to operate a switch located on the dash, at the side of the seat, or in any place but upon the vehicle controls where the hands are ordinarily placed in operating the vehicle.

The present invention overcomes all of these objections by locating the signal switch at the upper end of the gear shift lever where it is convenient of access to the operator's hand and where the hand naturally is placed in effecting any change of speed in the operation of the vehicle.

The present invention differs from other shift lever switches in providing a three-way switch which is operated by turning the knob of the gear shift lever in either direction from a central position or longitudinally of the lever for the third position.

Referring now more particularly to the drawing, this switch is attached to the extremity of a gear shifting arm or lever 10 and comprises an inner or plug member 11 preferably of insulating material threaded on the end of the lever with a gear shifting knob 12 rotatable and longitudinally movable thereon. Movement of the knob on the inner member is determined by means of a T-shaped slot having a portion 14 which extends around the outside of the member 11 and a portion 15 which extends longitudinally of the member and preferably at right angles to the portion 14. In the outer surface of the knob is a circular groove 16 in which is seated a spring holder 17 having one extremity 18 which extends inwardly through a hole 19 extending from the groove 16 so that the inner end of this extremity 18 engages in the portions 14 and 15 of the T-shaped slot in order to limit the movement of the knob with respect to the inner member and the said inner end 20 is preferably rounded to engage in recesses 21, 22, 23 and 24 at the bottom of the slots for releasably positioning it in a central or neutral position and in each of the other positions. In moving the knob the extremity 18 of the spring has sufficient resiliency to ride out of any recess and to engage in any other recess, depending upon the direction in which the knob is turned. Thus there is no tendency of the knob to become disengaged from any position in which it is set after it is turned by hand to that position.

In order to make suitable electric connections by the turning of the knob, a plurality of spring-pressed contacts are located in recesses 25 at the side of the member 11 opposite the T-shaped slot and adapted to be engaged by a contact plate 26 set into the inner surface of the knob for that purpose.

These connections are made by means of contact members or balls pressed outwardly by springs 27 connected to conductors extending upwardly through passages 28 bored or cast in the end of the inner member 11 so that they will not interfere with the turning of the knob. A central spring-pressed contact member 30 is adapted to make a continuous contact with the plate 26 and it is connected by a conductor 31 with a battery 32 or other suitable source of current supply, the other side of the battery being connected to ground. At opposite sides of the contact 30 are spring-pressed contacts 33 and 34 connected by conductors 35 and 36 respectively to right and left signal lamps 37 and 38, one terminal of each lamp being grounded. Another spring-pressed contact 39 is located longitudinally with respect to the contacts 33 and 34 in the member 11 and is connected by a conductor 40 with a stop or other signal lamp 41, one terminal of which is connected to the ground. Thus when the knob is turned in one direction it will close a circuit to one of the lamps 37 and when turned in the other direction it will close a circuit to the other lamp 38 and when the knob is moved longitudinally it will close a circuit to light the lamp 41.

In order to indicate the direction in which the knob is turned a small electric lamp 42 is seated in a socket 43 at the end of the inner member 11 close to but covered by the outer end of the knob so that the lamp will be protected thereby. If the knob is made of transparent material the light may show through it, but preferably a row of openings 44 are positioned in a line extending from the center of the outer end of the knob which indicate the direction in which the knob is turned from a central position. If the line of openings 44 is in the central position the lamp will be lighted when the knob is moved longitudinally and the lamp will be dark when the lamp is at its central or neutral position. In order to light the lamp each right, left and stop position of the inner member may be provided with a spring-pressed contact 45 connected with the lamp 42 by conductors 46, one side of the lamp 42 being grounded in accordance with common practice.

Thus as clearly shown in Fig. 5, when the contact plate 26 is moved by the knob to either side or longitudinally of its central position it will make an electrical connection between the contact 30 and the right, left or stop contacts, depending upon the direction in which the knob is moved, and will also light the signal lamp 42.

In order to repair the switch or any of the contacts thereof, or to replace the lamp 42, it is necessary only to withdraw the extremity 18 from its engagement with the T slot whereupon the knob may be slipped from the end of the member 11 and the resiliency of the spring 17 will hold it in place without requiring the removal of the spring from the groove 16. To replace the knob the rounded extremity 20 of the spring must be withdrawn until it registers with the T slot. It will ride upon the outer surface of the member 11 until the slot registers with the end 20 of the spring which will then be retained in the slot.

The simplest representation of the signal system to which this may be applied is shown in Fig. 6 in which there are right, left and stop indicators 51, 52 and 53 respectively of a rear signal, receiving current through a gear shaft lever switch 50 as above described having the signal lamp 42 and conductors 35, 36 and 40 leading thereto and receiving current from the battery 32 as shown in the diagram of Fig. 5.

In the diagrammatic representation shown in Fig. 7 there are front and rear directional signals 61 and 62 at one side of the vehicle and 63 and 64 at the other side of the vehicle, and an ordinary stop signal lamp 65 receiving current through conductors 66 and a pedal switch 67 closed in an ordinary manner by a brake pedal 68. A stop signal lamp 69 corresponds to the stop signal lamp 41 of Fig. 5, and the knob switch 50 is the same as that represented in Fig. 6 with a switch signal lamp 42 showing the position of the knob as before explained. This diagram shows the manner in which this gear shift lever switch and the signalling system controlled thereby may be applied to or used in conjunction with any ordinary signal lamp system as now employed in connection with automobiles having a stop-light which is automatically operated whenever the foot pedal is pressed.

By connecting the stop lamps 65 and 69 together by a conductor 70 both lamps are lighted when either the pedal switch 67 or the knob switch 50 is closed; or either one of the lamps may be omitted.

Thus it will be seen that the present invention provides a simple switch construction which is easily installed at the top of a regular gear shift handle or lever and the conductors necessary for its operation may be closely connected to the lever so that they will not be in the way and may extend down below the bottom of the vehicle where they are appropriately wired to the lights at the back, and at the front of the car if necessary. This signalling system and the control switch will therefore comply with the requirements for safety signalling. The switch is simple in construction and is not likely to get out of order when once it is installed and the proper connections are made.

I claim:

1. Electrical switch mechanism for a self-propelled vehicle having a gear shift lever comprising a contact member secured to the shifting end of the lever, a knob mounted upon the member having an inside fixed plate providing switch means for cooperating with the contact member, the knob being movable in opposite directions from a central position for making right and left contacting connections and being movable lengthwise of the lever from said central position for making a third connection without removing the hand of an operator from the knob and lever.

2. An electrical switch mechanism for a gear shift lever of an automobile, comprising a member fixed to the end of the lever having spaced contact members therein, and a knob for the lever rotatable on the member and also longitudinally thereof with a single inset plate to make three different connections from a central or neutral position.

3. In a gear shift lever switch in accordance with claim 2, a spring retainer and a groove in the outer face of the knob in which it is seated, a projection from the retainer extending inwardly, and a T-shaped slot in the inner member engaging the end of the projection and limiting the movement of the knob thereon.

4. In an electrical switch for a gear shift lever of an automobile, an inner member fixed to the end of the lever, switch contacts spaced apart around the member and endwise thereof from a medial position, a knob surrounding the end of the member having an inner contact plate to make circuit closing connections with said contacts by turning the knob in either direction rotarily or moving it endwise from said medial position, and means confining the knob on the member and limiting its movement to make said connections.

5. A gear shift lever switch in accordance with claim 4, in which the knob is turned in either direction or moved lengthwise to make three different connections, a single lamp carried by the inner member and lighted when any of the three connections are made, and an opening in the knob lighted by the lamp and moved with the knob to indicate the direction in which the knob is moved.

6. In a gear shift lever switch, an inner member fixed to the end of the lever, a knob movable on the member, means limiting the knob to a rotary movement in either direction and longitudinally from a central position, circuit closing means comprising a single inner contact plate carried by the knob and spaced contacts carried by the member and brought together in any of the three movements of the knob from its central position, a lamp in the end of the member and means for closing a circuit to it when any of the three circuit closing means are brought together, perforations in the knob through which the lighted lamp is visible, the perforations being in line and indicating by their position which circuit closing connection is made and being unlighted in the central position.

7. A shift lever switch comprising an inner member fixed to the end of the lever, a knob movable on the member, a spring detent on the knob extending inwardly therethrough, a slot in the outer surface of the member engaged by the end of the detent for limiting the movement of the knob in either direction and longitudinally from a central or neutral position, depressions in the slot to engage the end of the detent and hold the knob resiliently in set positions, circuit closing means on the inside of the knob and the outside of the member engaged when the knob is moved from a neutral position into any one of the set positions, an indicator visible on the surface of the knob, and a single lamp lighted by said means for showing the position of the knob by said indicator when it is moved from neutral position.

8. A gear shift lever switch comprising an inner member fixed at the end of the lever, a plurality of recesses spaced apart around and lengthwise of the outer surface of the member from a neutral or medial position, contact members pressed outwardly in said recesses, a knob movable on the member having a single fixed contact plate on the inside to engage said contact members for making different circuit connections as the knob is turned in opposite directions and moved lengthwise from the neutral position.

9. A gear shift lever switch in accordance with claim 8 in which the member has a single indicating lamp with one of said contact members at each of the spaced apart positions of the knob all connected to the lamp so that the same indicating lamp is lighted at each of the circuit closing positions of the knob, the knob having indicating means illuminated by the lamp and showing by the position of said means which circuit connection has been closed.

PERCY W. PYBUS.